(12) United States Patent
Funato et al.

(10) Patent No.: US 9,065,356 B2
(45) Date of Patent: Jun. 23, 2015

(54) ELECTRIC POWER CONVERTER

(75) Inventors: Hiroki Funato, Fujisawa (JP); Takashi Suga, Yokohama (JP); Makoto Torigoe, Ayase (JP); Keisuke Fukumasu, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 139 days.

(21) Appl. No.: 13/976,111

(22) PCT Filed: Feb. 22, 2012

(86) PCT No.: PCT/JP2012/001173
§ 371 (c)(1),
(2), (4) Date: Jun. 26, 2013

(87) PCT Pub. No.: WO2012/117694
PCT Pub. Date: Sep. 7, 2012

(65) Prior Publication Data
US 2013/0322144 A1    Dec. 5, 2013

(30) Foreign Application Priority Data

Feb. 28, 2011  (JP) .................................. 2011-041093

(51) Int. Cl.
*H05K 7/20* (2006.01)
*H02M 7/537* (2006.01)
*H02M 7/00* (2006.01)

(52) U.S. Cl.
CPC .............. *H02M 7/537* (2013.01); *H02M 7/003* (2013.01)

(58) Field of Classification Search
USPC .......... 363/131, 141, 146; 361/600, 676, 677, 361/678, 679.46, 679.47, 679.48, 679.52, 361/688, 689, 690, 694, 695, 714, 719, 720
See application file for complete search history.

(56) References Cited

U.S. PATENT DOCUMENTS

| 6,459,605 | B1 | 10/2002 | Reichard | |
| 2003/0053298 | A1* | 3/2003 | Yamada et al. | 361/728 |
| 2003/0179596 | A1* | 9/2003 | Joseph et al. | 363/141 |
| 2012/0326799 | A1 | 12/2012 | Takahashi et al. | |

FOREIGN PATENT DOCUMENTS

| JP | 9-135565 A | 5/1997 |
| JP | 10-98887 A | 4/1998 |
| JP | 2005-235929 A | 9/2005 |
| JP | 2006-230064 A | 8/2006 |
| JP | 2011-135705 A | 7/2011 |

OTHER PUBLICATIONS

International Search Report dated May 22, 2012 with English translation (Five (5) pages).

* cited by examiner

*Primary Examiner* — Nguyen Tran
(74) *Attorney, Agent, or Firm* — Crowell & Moring LLP

(57) ABSTRACT

There is provided a technology for realizing a low-cost electric power converter operating at low noise under a high-temperature environment. The electric power converter is provided with an enclosure, a power module including a switching element, a driver circuit for generating a signal for driving the switching element, a control circuit board for generating an actuating signal to be sent out to the driver circuit, a base plate with the control circuit board mounted thereon, and a connection part for connecting between the enclosure and the control circuit board. The enclosure is provided with two openings adjacent to each other, and the base plate or the opening of the enclosure is provided with the connection part.

7 Claims, 4 Drawing Sheets

FIG. 4A
CASE WHERE
NO GROOVE IS PROVIDED

FIG. 4B
CASE WHERE
A GROOVE IS PROVIDED

ELECTRIC POWER CONVERTER

TECHNICAL FIELD

The present invention relates to an electric power converter, and in particular, to a structure small in size, capable of suppressing mutual electromagnetic interference at a low cost.

BACKGROUND

A power storage apparatus for supplying DC power is made up of a DC power holding unit, such as a battery, a capacitor, and so forth, a control-monitor circuit for monitoring a residual power capacity, and a supply power value, and so forth. Further, an electric power converter, such as an inverter for generating an AC voltage from a DC voltage supplied by the power storage apparatus, and so forth, is made up of a main circuit (a power module) including a switching element, and so forth, a driver circuit (a gate driver) for generating a signal for driving the switching element, a smoothing capacitor, and a control circuit for generating an actuating signal to be sent out to the driver circuit, and so forth.

With the electric power converter of this type, high-speed switching performed by the power module causes the power module to act a primary noise-generation source, and therefore, a control circuit board has needs for devising novel circuitry idea, and structural idea for the purpose of rendering the power module insusceptible to interference by noises generated by these power modules.

For example, with a technology disclosed in Japanese Unexamined Patent Application Publication No. 2005-235929, a structure is adopted whereby both a power module, and a smoothing capacitor are separated electromagnetically and thermally from other constituent elements, thereby preventing heat generated by the power module from interfering with a gate river, and a control circuit, while preventing noises generated by the power module, and the smoothing capacitor, respectively, from being mixed into the gate river, and the control circuit, respectively.

Further, in Japanese Unexamined Patent Application Publication No. 2006-230064, a structure is disclosed whereby a power module, a smoothing capacitor, and so forth are hosed in an enclosure, while a gate driver, and a control circuit board are housed in another enclosure, thereby preventing noise generated by the power module from being mixed into the gate driver by combing these enclosures with each other.

SUMMARY

The electric power converter needs to devise a configuration whereby the noise generated by the main circuit is prevented from propagating to the control circuit, as shown in those examples. In the case of a configuration shown in Japanese Unexamined Patent Application Publication No. 2005-235929, an electromagnetic blocking member is inserted between a gate driver circuit board and the power module, thereby suppressing propagation of the noise, however, because an interconnection member for transmitting a gate signal is present between the gate driver and the power module, an opening for penetrating through the interconnection member need be bored in the electromagnetic blocking member. If the opening exists in the electromagnetic blocking member, a noise current flows through the electromagnetic blocking member by the agency of a noise magnetic field interlinking the opening. The flow of the noise current causes a potential variation to occur to the electromagnetic blocking member, whereupon there arises a problem in that a noise is transmitted to the control circuit board.

Further, in the case of a configuration shown in Japanese Unexamined Patent Application Publication No. 2006-230064, in order to prevent noise generated by the power module from being mixed into the gate driver, the power module, and the gate driver are housed in respective enclosures shielded against each other, however, the interconnection member for transmitting the gate signal is required between the gate driver and the power module, as described in the foregoing, and a through-hole for allowing the interconnection member to penetrate through the enclosure is present in the respective enclosures. In this case as well, a noise current is similarly induced by interlinking of the through-holes with each other by the agency of a noise magnetic field, thereby causing the potential variation to occur to the respective enclosures. The enclosure is normally at GND (a reference potential) of the control circuit, so that the noise attributable to the through-holes will become a noise of the control circuit board, and a problem has arisen in that this noise causes occurrence of malfunction, and noise leakage to the outside of the electric power converter.

Even though the propagation of the noise can be reduced by electromagnetic blocking of the structure to thereby achieve an improvement, as above-described, the blocking of the noise is incomplete because there exists the through-hole for the interconnection member, and so forth, so that there has existed a problem in that it is impossible to suppress the noise propagation caused by the magnetic field interlinking the through-holes with each other.

The present invention has been developed to solve those problems. More specifically, it is an object of the invention to provide an onboard electric power converter capable of not only effectively blocking noises by introducing structural ingenuity, but also realizing miniaturization, and cost reduction, with high reliability.

A representative embodiment of the invention as disclosed in the applicant's invention is broadly described as follows.

In accordance with one aspect of the invention, an electric power converter (1) includes an enclosure; a power module configured by including a switching element; a driver circuit that generates a signal for driving the switching element; a control circuit board that generates an actuating signal to be sent out to the driver circuit; a base plate with the control circuit board mounted thereon; and a connection part that connects between the enclosure and the control circuit board, and the enclosure is provided with two openings adjacent to each other, while the base plate or the opening of the enclosure is provided with the connection part.

With the present invention, it is possible to prevent noise generated by a high-voltage power-supply system, such as a power module, a gate driver 208, and so forth, from being mixed into the control circuit board, and further, leakage of the noise to a harness for connection with outside the electric power converter is prevented. Furthermore, because noise propagation is structurally suppressed, a part for noise reduction is no longer required, so that miniaturization and reduction in cost can be realized.

DETAILED DESCRIPTION

An embodiment of the invention is described hereinafter with reference to FIGS. 1 through 7.

With the embodiment described hereunder, there is described an onboard inverter operating in a very severe heat cycle, operational environment, and so forth, in particular, cited as an example of an electric power converter to which the present invention is applied. The onboard inverter serving as a control unit for controlling the driving of an onboard electric motor (motor) is provided in an onboard electrical system, the onboard inverter being for use in converting DC power supplied from an onboard battery as a constituent of an onboard power-source into predetermined AC power, and supplying the AC power as obtained to the onboard electric motor, thereby controlling the driving of the onboard electric motor.

Further, a configuration described hereunder is also applicable to a DC-DC electric power conversion apparatus such as a DC-DC converter, a DC chopper, and so forth, and an AC-DC electric power converter, or a power storage unit connected to any of these electric power converters. Furthermore, the configuration described hereunder is also applicable to an industrial electric power converter for use as a control unit of an electric motor for driving production facilities, or a household electric power converter for use as a control unit of an electric motor for use in a household solar-power generation system, or for use as a control unit of an electric motor for driving household electrical products. The configuration described hereunder is preferably applied to an electric power converter aiming at reduction in both cost, and size, in particular.

FIG. 1 and FIGS. 5 through 7 each are a view showing the fewest necessary constituent elements in a structure of the electric power converter according to the invention.

Figure 1:
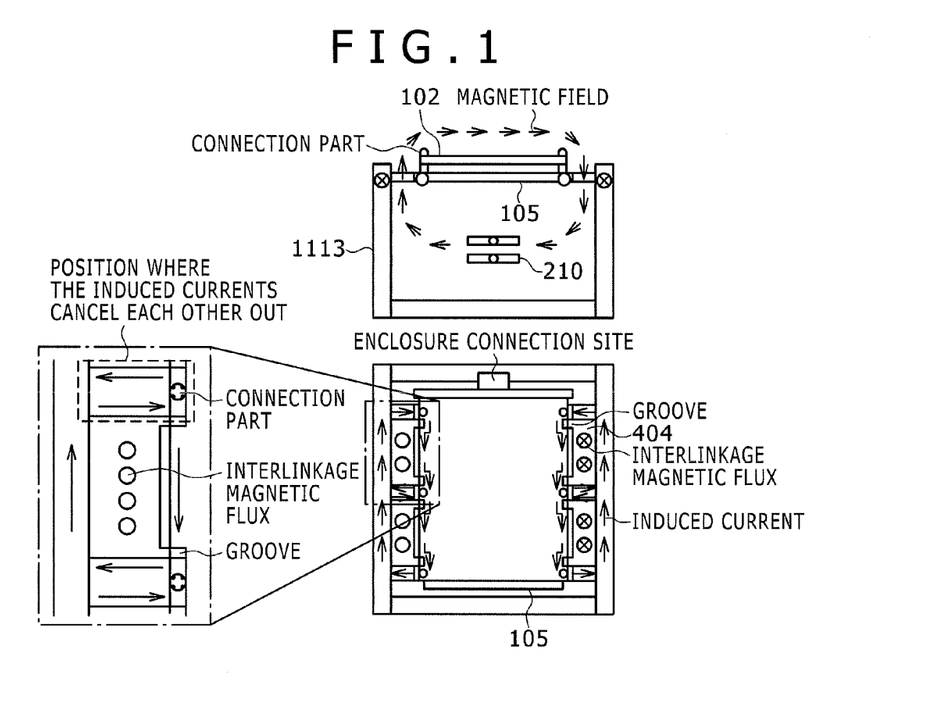
FIG. 1 is a view showing the structure of an electric power converter according to the invention.

FIG. 1 is a view showing the structure of the electric power converter according to the invention. A figure shown in the right upper part of FIG. 1 is a sectional view of the electric power converter according to the invention, a figure shown in the right lower part of FIG. 1 is a top view of the electric power converter, and a figure shown in the left lower part of FIG. 1 is an enlarged view of a part of the top view of the electric power converter according to the invention.

Figure 5:
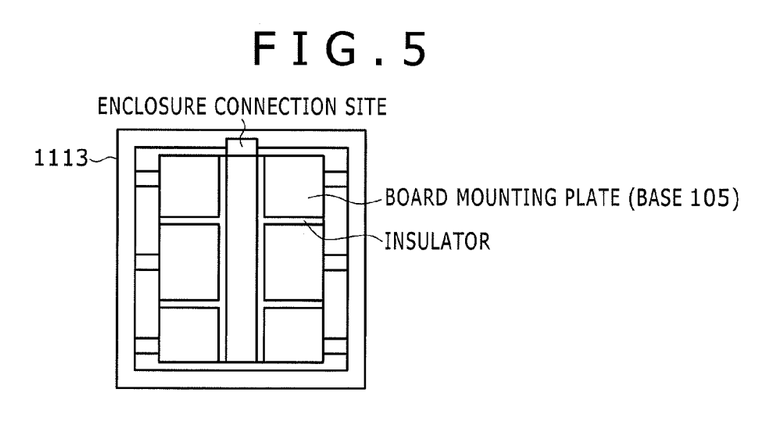
FIG. 5 is another view showing the structure of the electric power converter according to the invention.
Figure 6:
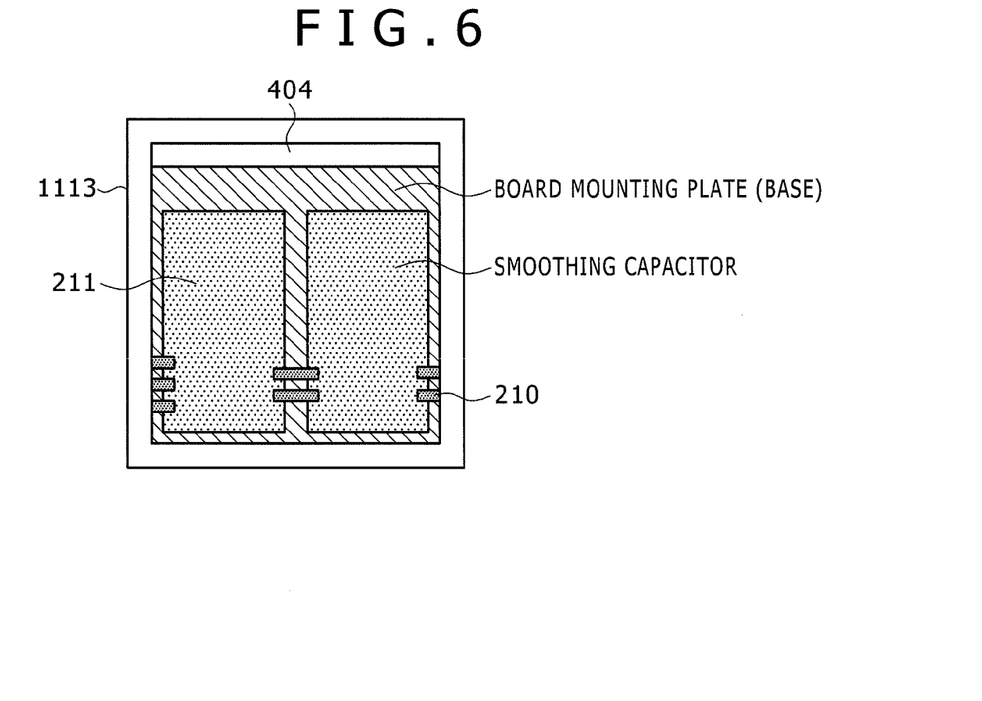
FIG. 6 is still another view showing the structure of the electric power converter according to the invention.
Figure 7:
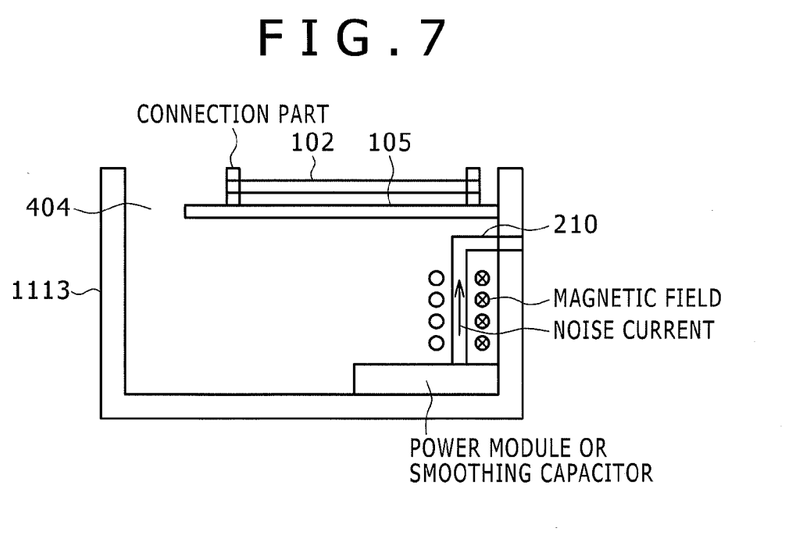
FIG. 7 is a further view showing the structure of the electric power converter according to the invention.

FIG. 5 is a top view of the electric power converter according to the invention, FIG. 6 is a side view thereof, and FIG. 7 is a sectional view thereof. The electric power converter according to the present embodiment of the invention is provided with a enclosure 1113, a control circuit board 102 for generating an actuating signal to be sent out to a driver circuit, a base plate 105 with the control circuit board 102 mounted thereon, connection components for use in securing holding the control circuit board 102, and a bus bar 210 for use in transmitting a high voltage, and a high electric current, respectively. The base plate 105 is made of material such as a metal higher in electrical conductivity than the control circuit board 102, the enclosure 1113, and the base plate 105, as a whole, are physically and electrically connected with each other, and upon the enclosure (case) 1113 being connected to GND of a vehicle, and so forth, the base plate 105 as well will be at the GND potential.

An external-connection connector for use in connecting the control circuit board 102 to devices outside the electric power converter is mounted on the control circuit board 102, or on a board dedicated for use by the connector such that the connector is similarly mounted in a space above the base plate as in the case of the control circuit board.

Figure 2:
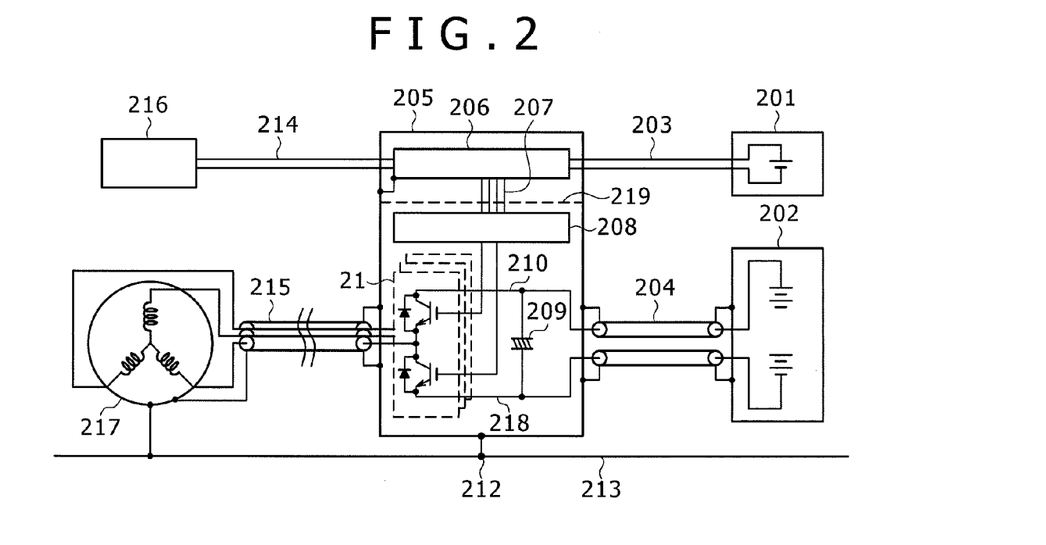
FIG. 2 is a schematic representation showing a circuitry operation of the electric power converter according to the invention.

FIG. 2 is a schematic representation showing a circuitry operation of the electric power converter according to the invention, and a noise generation mechanism is described hereinafter with reference to this schematic representation.

A voltage outputted from a high voltage battery 202 is applied to a smoothing capacitor 209, and upper and lower arms of a power module 211, respectively. Assuming that a switching element exists on the plus side, and the minus side, respectively, against each phase, an intermediate potential therebetween is linked with each phase of a motor 217 as a load. The switching element has a gate connected to a gate driver 208, and a signal for controlling the gate driver 208 is inputted from a control circuit board 206. Because respective parts of the control circuit board 206 and the gate driver 208 are operated by a low voltage battery 201, the low voltage battery 201 is connected to the control circuit board 206. In the case of the gate driver 208 requiring the low voltage battery 201, the low voltage power supply can be provided via the control circuit board 206. As power supply from the high voltage battery 202 reaches the gate driver 208, a low voltage may be generated from a high voltage by use of the DC-DC converter, and so forth. Because the control circuit board 206 is required to control the operation of the electric power converter, and to exchange a signal with an external device of the electric power converter, the control circuit board 206 is connected to an external device 216 by use of a harness 214, and so forth.

The GND of the control circuit board 206 is electrically connected to an enclosure 205, and the enclosure 205 is connected to GND 212 outside the electric power converter. The motor 217 as the load is connected to the electric power converter by use of a shield cable 215, and both GND's of the cable and a motor enclosure are connected to the same GND 212. Both of a high voltage battery enclosure and GND of a high voltage DC cable 204 are similarly connected to the same GND.

In this state, the control circuit board 206 outputs a control signal such as a PWM signal, and so forth to the gate driver 208 in order to activate the motor 217. Upon the gate driver 208 receiving these signals, the gate driver 208 repeatedly turns the switching element ON/OFF.

In the case where one of the switching elements, on the plus side, (the upper arm) is turned ON, electrical charge that is supplied from the high voltage battery to the smoothing capacitor will pass through the bus bar 210, the switching element 211, and the cable 215 to flow to the motor 217, subsequently passing through the other element on the minus side 218 thereof, in the ON state, so as to return as an electric current to the high voltage battery 202. These PWM signals has a switching frequency on the order of several tens of kHz or less, however, the PWM signal includes a high frequency component on the rising edge of a pulse, and on the falling edge thereof because the PWM signal is in a pulse waveform, so that these high-frequency current noises will flow through those paths described as above.

At this point in time, the respective ends of the shield cable 215 connecting the electric power converter to the motor 217 are connected to GND, so that an electric current flows in such a direction as to cancel out a magnetic field generated by a loop current of a motor signal. Further, since the respective ends of the shield cable 215 are at the GND potential, it can be assumed that an electromagnetic field radiated by the electric current in the shield cable 215 will be very small only if resonance occurrence due to a cable length is heeded. The same can be said of the shield cable 208 connecting the high voltage battery 202 to the electric power converter.

However, because the bus bars 210, 218 with a switching noise current described as above flowing therethrough are not shielded inside the electric power converter, the magnetic field is not cancelled out, so that a strong noise magnetic field is caused to occur inside the electric power converter. If the bus bars 210, 218 are laminated with each other to be assembled in a state where the plus side, and the minus side are in close proximity with each other to thereby minimize a loop formed by the switching noise current, this will enable a radiation noise magnetic field to be reduced, however, there occurs a spot where the plus side comes away from the minus side owing to structural constraints, such as a connection part with an external cable, and so forth, whereupon the spot becomes a generation source of a noise magnetic field. If the bus bars 210, 218 are shielded, the noise magnetic field can be inhibited, however, there arises a problem of deterioration in the PWM waveform owing to an increase in parasitic capacitance due to use of a shield structure in addition to problems such as occurrence of an unbalanced current, at a connection part of the smoothing capacitor 209, and an increase in cost.

Further, even if the noise magnetic field caused by a motor-driving current is inhibited, a parasitic capacitance against GND actually exists in the motor 217, and the cable 215, respectively, and a portion of the motor-driving current flows out of GND 213 via these parasitic capacitances to subsequently return to the smoothing capacitor 209, and the high voltage battery 202. Such a leakage current as described flows through a spot where a current path through which the leakage current flows to the motor 217 is physically parted from a current path through which a current (return current) returning to the high voltage battery 202 flows, so that an unbalanced current flows through the bus bar 210, on the plus side 210, and the bus bar 218, on the minus side 218, respectively, inside the electric power converter, thereby causing a strong magnetic field to be generated.

Figure 3:
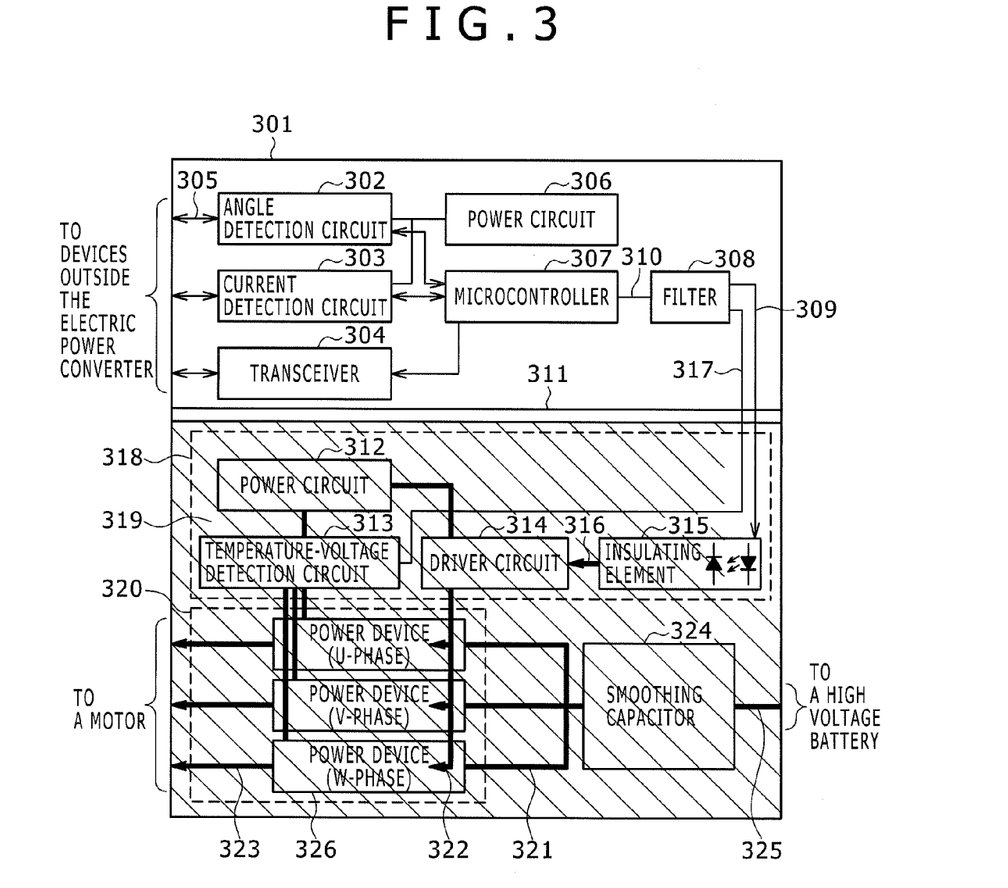
FIG. 3 is a schematic representation showing a circuit configuration, and a base position, inside an inverter.

FIG. 3 is a schematic representation showing a circuit configuration, and a base position, inside an inverter. The circuit configuration inside the inverter and the position of the base for use as an electromagnetic separation function are described in detail with reference to FIG. 3. In FIG. 3, an electric power converter (A in FIG. 2) is enlarged, and a configuration thereof is depicted in detail.

On a control circuit board 301 (206), there are mounted an angle detection circuit 302 for detection of a rotation angle of the motor 217, a current detection circuit 303 for detection of a current flowing to the motor 217, a transceiver 304 for carrying out communications with the external device of the electric power converter, a power circuit 306 for supplying power to ICs and so forth, on the control circuit board, a microcontroller 307 for controlling these constituents, and so forth. All the constituents are operated at a low voltage in a range of about 1 to 15 V.

On a gate driver board 318 (208), there are mounted an insulating element 315 for effecting electrical isolation from the control circuit board 206, a driver circuit 314 for driving a power device 326, a temperature•voltage detection circuit 313 for monitoring temperature•voltage of the power device 326, a power circuit 312 for supplying power to these circuits on the gate driver, and so forth.

The circuits on a side of the insulating element 315, adjacent to the driver, include a circuit that is operated at a high voltage in a range of 15 volts to several hundred volts, and a number of the power devices 326, corresponding to the number of phases used by the power devices 326, respectively, for driving the motor 217, are mounted on a power module 320, each of these power devices performing switching between high voltages at several hundred volts.

A smoothing capacitor 324 is mounted inside the inverter in order that electrical charge is supplied to the respective power devices 326 at a high speed, and a voltage at several hundred V is applied thereto, as is the case with the power device 326. In the figure, lines with a high voltage applied thereto are each indicated by a thick, heavy line.

In this connection, a bus bar 321 for connection between the smoothing capacitor 324 and the power device 326 is required to be shortened in order to supply an electrical charge to the power device 326 at a high speed to thereby lower inductance. If parasitic inductance of the bus bar 321 is large, this will cause an increase in noise at the time of the switching, an increase in radiation noise due to an increase in voltage drop, deterioration in operation specification, and so forth. Accordingly, the smoothing capacitor 324, and the power module 320 need be brought into close proximity with each other via a cooling mechanism and so forth, as necessary, on a disposition layout.

Further, a gate signal line 322 for connecting the driver circuit 314 to each of the power devices 326 is a signal line for transmitting a rectangular signal for driving the power device 326, and if this signal line is lengthened, this will similarly cause deterioration in signal waveform, due to an increase in inductance, and deterioration in an SN ratio (Signal to Noise ratio) due to an increase in noise superimposed on the signal line, thereby leading to malfunction, and deterioration in performance. Accordingly, the driver circuit 314 need be connected to the power device 326 across a short distance.

If a signal line for connecting the temperature-voltage detection circuit 313 to the power device 326 is similarly long, this will induce deterioration in detection accuracy, and therefore, these signal lines similarly need be rendered shorter.

Further, the power circuit 312 for use in the gate driver is used for the driver circuit 314, and the detection circuit 313 for respective types, and a switching noise generated at the time of switching a PWM gate switching signal between High/Low, and so forth, are prone to be superimposed on power supply•GND. More specifically, for the purpose of suppressing noise radiation from a power supply path, and preventing the noise from being mixed into the power supply path, there is the need for shortening a power supply path 317 for connecting the power circuit 312 (306) to the driver circuit 314, and the temperature•voltage detection circuit 313, respectively. If these circuits are on the same board, a supply path of power supply/GND is preferably in plane (land) shape from the viewpoint of reducing the inductance of the power supply path 317.

In view of the above, the insulating element 315, the driver circuit 314, the temperature•voltage detection circuit 313, and the power circuit 312 for supplying power to these circuits are preferably disposed on the same board in order that all those circuits are mounted in close proximity with each other.

Meanwhile, the angle detection circuit 302, and the current detection circuit 303 each have a function for converting an analog value of a voltage, or an analog value of a current into a digital value to thereby transmit the digital value to the microcontroller 307 via a signal line, and these analog value are prone to induce performance deterioration•malfunction due to superimposition of noise. Further, besides the above, the microcontroller 307, the transceiver 304, and a part of the power circuit 306, and so forth are operated by a low voltage at 5 V or lower, as compared with the driver circuit, and so forth, on the gate driver, so that if these are subjected to noise equivalent to the noise of the driver circuit, and so forth, an SN ratio is prone to further deterioration.

Accordingly, if the insulating element 315, the driver circuit 314, the temperature•voltage detection circuit 313, the power circuit 312 for supplying power to these circuits are electromagnetically separated from the microcontroller 307, the angle detection circuit 302, and the current detection circuit 303, the transceiver 304, the power circuit 306 for supplying power to these constituents, and a filter 308 by means of a base 311, this can prevent respective noises generated by the circuits on the gate driver from being mixed into the control circuit, that is, performance deterioration caused by the noise can be prevented. For an embodiment of the invention, capable of realizing the above, a configuration can be considered whereby a gate driver board 208 having the insulating element 315, the driver circuit 314, the temperature•voltage detection circuit 313, and the power circuit 312 for supplying power to these circuits is a board different from the control circuit board 206 having the microcontroller 307, the angle detection circuit 302, and the current detection circuit 303, the transceiver 304, the power circuit 306 for supplying power to these constituents, and the filter 308, thereby allowing the gate driver board 318 to adopt, for example, a stacked-type mounting structure with the power module 211 superimposed thereon, as shown in FIG. 1.

Further, the insulating element 315 of a PWM signal transmission path from the microcontroller 307 is operated in a voltage system differing in respect of the driver circuit, and so forth from the microcontroller 307, and so forth, and use is made of the insulating element 315 in order to prevent a surge voltage at a high voltage, on the driver circuit side, and so forth, from being mixed toward the microcontroller side because the driver circuit side is operated at a high voltage. Accordingly, a signal line 316 connecting the insulating element 315 to the driver circuit 314 executes signal transmission in a voltage system higher than the microcontroller, and so forth, so that the signal line 316 is prone to generate a relatively large noise than the control circuit. Accordingly, in order to render the signal line 316 as short as possible, the insulating element 315 is preferably disposed in close proximity of the driver circuit 314.

Meanwhile, because a signal line 309 connecting the insulating element 315 to the filter 308 is in a signal system for a low voltage supplied by the power circuit 306 via the microcontroller 307, the signal line 309 as well is preferably rendered as short as possible for the purpose of preventing noise from being superimposed thereon. In this connection, the noise superimposed on the signal line 309 is subjected to filtering by the filter 308, so that a signal line 310 connecting the filter 308 to the microcontroller 307 is has a low noise as compared with the signal line 309. In order to render the signal line 309 short in length for reasons described as above, it is important that a distance from a connector for connection with the control circuit board 301 (102 in FIG. 1) to the insulating element 315 on the gate driver board 318 is shorter than a distance from the insulating element 315 to the driver circuit 314. Further, it is important that a distance from a connector for connection with the gate driver board 318 to the filter 308 is shorter than a distance from the filter 308 to the microcontroller 307 on the control circuit board 301.

With the present embodiment of the invention, a noise magnetic field generated by the agency of the motor-driving current inside the electric power converter is shielded by the base 311 (105, in FIG. 1). In the case where material whose relative permeability is sufficiently higher than 1, such as iron, and so forth, is used for the base plate 105, magnetic fluxes are confined within the base, so that noise magnetic fluxes are not mixed into space above the base, which is desirable. However, even if use is made of material low in relative permeability, such as aluminum, and so forth, a current for cancelling out interlinkage magnetic fluxes will flow through the base plate 105 provided that the material has electrical conductivity, so that the base plate 105 will have a magnetic-field shield effect. Further, because the base plate 105 is electrically connected to the GND of the control circuit board 102, the base plate 105 preferably has electrical conductivity regardless of magnitude of relative permeability.

Next, the shape of the base plate 105 (219) is described hereinafter with reference to FIGS. 1, and 2. The base plate 105 is assembled between the control circuit board 102 and other constituents including the cooling mechanism, the power module 211, and the gate driver 208, and further, the control circuit board 206 is mounted on the base plate 105 by screwing and so forth, whereupon a stacked-type high-density mounting structure is realized.

In the case where the electric power converter in whole is mounted at a spot undergoing large vibration, it is important to set a vibration resonance frequency of the base plate 105 to a value higher than a vibration frequency band of the electric power converter so that the vibration of the electric power converter is prevented from being increased to be propagated to the control circuit board 206. More specifically, it is important to increase the number of fixed points such as screws for use in assembling the base plate 105 with the enclosure 1113, or the like, to thereby turn the vibration resonance frequency into a higher frequency.

A protrusion provided on the base has a function for allowing heat generated by a high heat-generation part to be released to the base plate 105 by butting the protrusion against the back side of the high heat-generation part on the control circuit board. At this point in time, there is the need for causing the heat propagated from the high heat-generation part to the base plate 105 to be transferred from the base plate 105 to outside air, or a cooling mechanism holding cold water, so that the base plate 105 need be thermally coupled to a relatively low-temperature site such as the enclosure 1113, or the cooling mechanism. More specifically, it is preferable that respective members are physically in contact with, and fixed to each other, or the base plate 105 is assembled with other members by use of a heat-transfer member such as a heat pipe, and so forth. Furthermore, for the purpose of preventing deterioration in heat resistance reproducibility, due to contact-variation, and so forth, at the time of butting the base plate 105 against the back side of the high heat-generation part, a sheet-like heat-transfer material low in rigidity is preferably provided between the base plate 105 and the control circuit board 102. In this case, the base plate 105 being at the GND potential, the heat-transfer member having no electrical conductivity is preferably used in order to prevent occurrence of a short-circuit trouble, due to electrical contact with the control circuit.

Further, the protrusion provided on the base fulfills a function of a support member for supporting the control circuit board 102 by butting the protrusion against the back side of the high heat-generation part on the control circuit board 102, playing also a role for enhancement of resistance against vibration. Accordingly, in the case where the heat-release protrusion is disposed on the back side of the heat-generation part, an effect such as deterioration in resistance against vibration will be small even if the number of screws in the vicinity of the heat-release protrusion is decreased. That is, if the number of screwed spots is decreased, this will generally cause a vibration resonance frequency of the board to tend to be lower in frequency, however, if the heat-release protrusion is added, the number of board-supporting spots will increase, and resonance frequency will become higher, resulting in enhancement in resistance against vibration performance. At this point in time, in order to cause the heat-release protrusion to support the board by adding a force working only in a direction for pushing up the board from the back side thereof, the heat-release protrusion is preferably rendered greater in height than a protrusion for a screw used for fixing the board to the extent that stress imposed on the part on the board, and on solder will cause no problem.

Thus, the number of the screws can be reduced by optimization of a layout of the heat-release protrusions, that is, the heat-generation parts, on the control circuit board 102, and since an antinode of vibration generally occurs at a midpoint between any two spots of the screws for use in fixing the board at the time of the lowest natural vibration resonance of the board, if the heat-release protrusion, that is, the heat-generation part is disposed at the midpoint position between the screws for use in fixing the board, resistance against vibration performance can be enhanced.

Respective values with respect of the number of the screws for use in fixing the control circuit board 102, and the number of the heat-release protrusions, are decided upon predicated on the above, and according to a multitude of factors such as a vibration condition in an environment where the electric power converter is mounted, a service life required, a structure of the electric power converter, a size of the control circuit board, and so forth from the standpoint of ensuring resistance against vibration, so that these values are preferably decided upon by carrying out vibration simulation or analysis, with these factors taken into consideration.

A size of the heat-release protrusion is preferably altered so as to match the size of the heat-generation part as a heat release target, and it is basically preferable that the size of the heat-release protrusion is larger than the size of a heat-release pad of the heat-generation part as the heat release target. A BGA part such as the microcontroller, and so forth, and a high power-consumption part such as a power transistor, and so forth are often provided with GND pins for heat release, and fins for heat release, and a pad and a land, for use in connection, are provided on the board side of each of these parts, so that a plurality of through-vias are provided in the land to thereby enable heat generated by the part to be drawn to the back side of the board. A land is provided on the back side of the board as in the case of the surface thereof, and the land is rendered larger in area than a contact area of the heat-release protrusion. As the land is in intimate contact with the heat-release protrusion via the heat release sheet 103, the heat generated by a part can be transferred to the heat-release protrusion on the back side of the board.

The structure according to the invention is described hereinafter with reference to FIG. 1. At least one screw among a plurality of the screws for use in fixing the board has electrical conductivity, a pattern for connection with the GND of the control circuit is provided on the board, and the board is fixed by use of the screws, whereupon the GND of the control circuit is electrically connected to the base plate.

Further, the base plate 105 has electrical conductivity, and is connected to the enclosure 1113 by use of a connection member such as a screw, and so forth. Accordingly, the GND of the control circuit is electrically connected to an enclosure potential via the base plate 105.

In general, the enclosure is at the GND potential of the electric power converter in whole, and the GND of the control circuit is preferably connected to the GND of the enclosure at an impedance as low as possible. The reason for this is because a potential variation due to a current flowing against GND need be minimized. Accordingly, a plurality of electrical connection points for connection between the control circuit and the base plate are generally adopted, and in order to stabilize the potential of the control circuit in whole, GND-connection points are preferably provided at intervals in the board, including the outer peripheral end thereof, each interval being not more than a given distance. Similarly, a plurality of electrical connection points between the base plate and the enclosure are preferably adopted, and is in general practice. In order to connect the base plate to the enclosure across a distance as short as possible, the enclosure is preferably provided on the periphery of the base plate.

Further, the base plate 105 needs to have an opening 404, or a site equivalent thereto, the opening 404 being for use in passing a connection part such as a cable or a harness, and so forth, for use in connecting the control circuit board 102 mounted in space above the base plate 105 to the gate driver 208 mounted underneath the base plate 105. The opening 404 is generally disposed between the end of the base plate 105, and the enclosure 1113. By so doing, a connector to be mounted on the control circuit board 102 can be mounted on the peripheral end of the board to thereby eliminate the need for providing the opening in the board. Further, the base plate 105 can be simplified in shape. In addition, a work such as connection between interconnection members becomes easier.

In FIG. 1, the main circuit, such as the power module, and so forth, and the bus bar 210 electrically connected thereto are disposed in space below the base plate. For brevity, the bus bar 210 only is show in FIG. 1. Flow of a switching noise current through the bus bar 210 causes a noise electromagnetic field to occur thereto. The figure shown in the lower part of FIG. 1 is the top view of the electric power converter according to the invention, and upon the noise magnetic field generated by the bus bar 210, interlinking the opening 404, the induced current by the agency of the noise magnetic field flows on the periphery of the opening 404. The orientation of the induced current is in a direction for cancelling out a magnetic flux interlinking the opening 404. The flow of the induced current causes a potential variation to occur to the base plate 105, and the enclosure 1113, respectively. If the potential variation occurs to the base plate 105, and the enclosure 1113, respectively, noise as a variation in the reference potential is propagated to the control circuit because the GND of the control circuit board 102 is connected thereto via the connection part such as the screw.

In order to suppress this, it becomes important that the connection point of the control circuit board 102 be provided at a point smaller in the potential variation. More specifically, if the connection point of the control circuit board 102 is provided at a position where the induced currents cancel each other out, located in a side common to the two openings, as shown in FIG. 1, this will enable a potential variation to be prevented from being propagated to the control circuit board 102. A current value is small at the position where the induced currents cancel each other out, so that the potential variation as well is small. Accordingly, propagation of the noise as the potential variation at GND can be suppressed. In the case where it is difficult to provide the screw for use in fixing the board at the position where the currents cancel each other out, it is effective to adjust the position where the currents cancel each other out by providing an enclosure-connection site of the base with a groove as shown in FIG. 1.

Figure 4A:
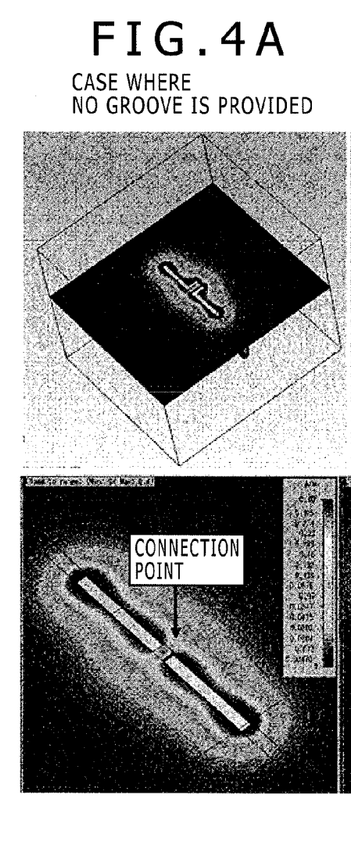
FIGS. 4A and 4B are views showing an effect of the electric power converter according to the invention.
Figure 4B:
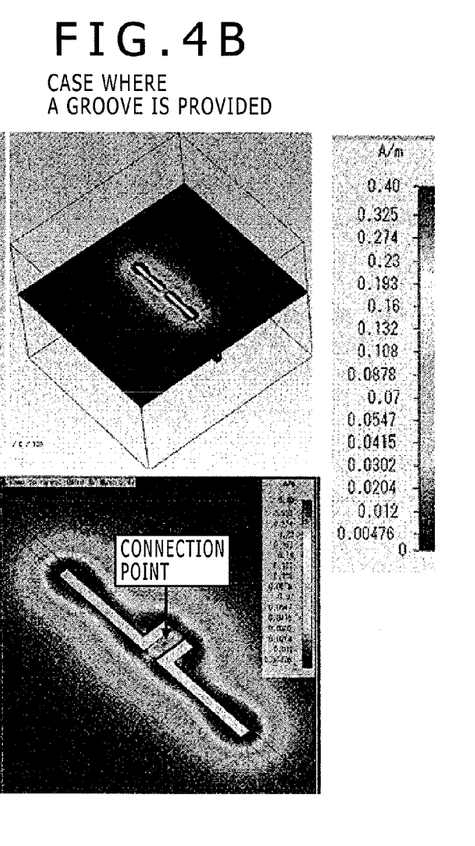

FIGS. 4A and 4B are views showing an effect of adjusting the position where the currents cancel each other out by providing one corner of the opening with the groove by means of an electromagnetic field analysis. In this case, a frequency was set to 10 MHz, and a square-type loop current source was disposed underneath a base-plate model to thereby generate a magnetic field acting upward from below the base plate. Results show respective intensity distributions of surface currents. In the case where no groove is provided as shown in FIG. 4A, surface current intensity at a connection point A as a connection position of a circuit board was on the order of 0.13 A/m, whereas in the case where a grove is provided as shown in FIG. 4B, surface current intensity at the connection point A was on the order of 0.03 A/m or less, apparently indicating that a current value is reduced to ½ or less owing to the effect of the induced currents cancelling each other out. Assuming that impedance of the base plate is unchanged, a difference in surface current as it is can be considered to represent a difference in surface potential variation. That is, this points to a possibility of suppressing a GND potential variation of the circuit board to ½ or less if the groove is provided, as described above, and the connection position of the circuit board is provided at the position where the induced currents cancel each other out. More specifically, if the groove is provided at a position symmetrical with respect to two openings adjacent to each other, the GND potential variation of the circuit board can be suppressed to ½ or less.

The magnitude of a current that is induced on the periphery of an opening is dependent on interlinkage magnetic flux intensity of the opening and an open area thereof. That is, the structure need be designed such that the induced current dependent on the open area and the interlinkage magnetic flux at one of the two openings is equivalent to the same at the other. If the respective induced currents at the two openings are not equivalent to each other, the effect of the currents cancelling each other is not obtained. More specifically, intensity of magnetic fields interlinking the two openings, respectively, can be found by an electromagnetic analysis by use of the bus bar, the interconnection, and the module, generating a noise magnetic field. If the respective magnetic fields interlinking the two openings differ in intensity from each other, this is taken into consideration, and two open areas are decided upon such that respective induced currents will be equivalent to each other.

Meanwhile, if the magnetic field interlinking the opening increases in intensity, the effect of direct coupling with the control circuit board installed in an upper part of the base plate will increase, and therefore the open area is preferably rendered as small as possible.

If the enclosure-connection site of the base, that is, a distance between the base plate and the enclosure increases in length, a parasitic inductance of the enclosure-connection site will increase, so that there occurs a potential variation owing to a noise magnetic field, and the distance is therefore preferably rendered as short as possible. More specifically, the distance is preferably on the order of 1/20 of a wavelength at a maximum frequency regarded as a target. Frequencies for use in a vehicle are frequencies, the upper limit thereof being on the order of 320 MHz, as occupied by AM radio, FM radio, digital audio broadcast (DAB), tire pressure monitoring system (TPMS), and so forth. A tolerable length of the connection part, found on the basis of 1/20 of a wavelength at this frequency upper limit value 320 MHz, is 47 mm. Further, the opening preferably has an opening length, in the longitudinal direction, on the order of the same value or less from the standpoint of suppressing interlinkage magnetic flux.

Further, in order to reduce an effect of a minute induced current that cannot be cancelled out, a magnetic field interlinking the opening, in the first place, that is, an induced current value is preferably reduced. For this purpose, mounting is preferably executed such that the longitudinal direction of the bus bar is in parallel with the center axial direction of the opening so as to have a structure capable of reducing the magnetic field interlinking the opening. The power module, and the smoothing capacitor each being a part of the transmission path of high voltage-high current, generating the noise electromagnetic field, therefore, these units each are preferably mounted at a position as far away as possible from the opening.

In order to interrupt a path of the induced current caused by the interlinkage magnetic flux, an insulator may be placed at a part of the base plate, on the periphery of the opening, thereby preventing the induced current from flowing in a loop shape. If no current path in the loop shape exists, the induced current is reduced in magnitude. Accordingly, the potential variation of the enclosure as well as the base plate, due to the induced current, becomes smaller to thereby exhibit a low-noise effect. In the case where, for example, it is difficult to mount the insulator at a part of the base plate, the base plate may be divided into a plurality of parts and a gap may be provided between the respective parts without those parts being connected with each other to thereby interrupt the path of the induced current.

As described in the foregoing, one embodiment of the applicant's invention is represented by an electric power converter (1) provided with an enclosure, a power module including a switching element, a driver circuit for generating a signal for driving the switching element, a control circuit board for generating an actuating signal to be sent out to the driver circuit, a base plate with the control circuit board mounted thereon, and a connection part for connecting between the enclosure and the control circuit board, and the enclosure is provided with two openings adjacent to each other, while the base plate or the opening of the enclosure is provided with the connection part.

Further, a variation (2) of the applicant's invention is the electric power converter described under (1) as above, where a groove is provided at one corner of an opening in the base plate or an opening between the base plate and the enclosure.

Still further, a variation (3) of the applicant's invention is the electric power converter described under (1) or (2) as above, where a part of the peripheral edge around the opening in the base plate or the opening between the base plate and the enclosure is an insulator.

Yet further, a variation (4) of the applicant's invention is the electric power converter described under (1) or (3) as above, where the opening in the base plate or the opening between the base plate and the enclosure is made up of a magnetic material.

What is clamed is:

1. An electric power converter comprising:
an enclosure;
a power module configured by including a switching element;
a driver circuit that generates a signal for driving the switching element;
a control circuit board that generates an actuating signal to be sent out to the driver circuit;

a base plate with the control circuit board mounted thereon; and a connection part that connects between the enclosure and the control circuit board, wherein two openings adjacent to each other are provided between the base plate and the enclosure, and wherein the connection part is provided at one side of the base plate, common to the two openings adjacent to each other.

2. The electric power converter according to claim 1, wherein the connection part is provided at a position where induced currents of the base plate cancel each other out.

3. The electric power converter according to claim 1, wherein a groove is provided at a position symmetrical with respect to the two openings adjacent to each other.

4. The electric power converter according to claim 1, wherein a part of a peripheral edge around the two openings adjacent to each other is an insulator.

5. The electric power converter according to claim 1, wherein the two openings adjacent to each other are each made up of a magnetic material.

6. The electric power converter according to claim 1, wherein the two openings adjacent to each other are structured such that respective interlinkage magnetic fluxes in the two openings are equivalent to each other.

7. The electric power converter according to claim 1, wherein the two openings adjacent to each other are provided between the end of the base plate and the enclosure.

\* \* \* \* \*